United States Patent Office 3,752,882
Patented Aug. 14, 1973

---

3,752,882
FLUX FOR GALVANIZING, TIN PLATING AND LEAD COATING
Wolfgang Muller, Mannheim-Rheinau, Germany, assignor to Th. Goldschmidt, A.G., Essen, Germany
No Drawing. Filed May 16, 1969, Ser. No. 825,451
Claims priority, application Germany, Dec. 12, 1968,
P 18 14 258.0
Int. Cl. C01b 9/00
U.S. Cl. 423—463
4 Claims

ABSTRACT OF THE DISCLOSURE

This invention relates to a compound having the formula $$ZnCl_2 \cdot Zn(NH_3)_2Cl_2 \cdot 3NH_4Cl$$

and to a process for the preparation thereof. The compound is useful as a flux for galvanizing, tin plating, lead coating, and soldering processes.

---

In German Pat. No. 1,078,842, there is described a process for the production of fine crystalline, non-hygroscopic, easily melting fluxes which are capable of flowing. These fluxes are useful for galvanizing, tin plating, and lead coating, and, in the preparation thereof, an aqueous solution or suspension containing 5 to 25 percent by weight of zinc oxide, 30 to 50 percent by weight of zinc chloride, and 30 to 70 percent by weight of ammonium chloride is evaporated at 15 to 30 torr and at a temperature of 50 to 80° C. while stirring.

The present invention relates to a new compound which remains flowable even under conditions of high atmospheric humidity and which is particularly suitable for use in automatic soldering devices. The new compound has the formula $$ZnCl_2 \cdot Zn(NH_3)_2Cl_2 \cdot 3NH_4Cl$$

This compound remains free-flowing even under conditions of relative atmospheric humidity in excess of 80 percent. In the case of a relative atmospheric humidity in excess of 90 percent, the crystals absorb some water but release it again at lower relative humidity. This characteristic, as well as the composition of the compound and the melting characteristics thereof, make it eminently suitable for mechanically executed soldering processes.

This compound can be produced by evaporating an aqueous solution containing about 5 to 25 percent by weight of zinc oxide, 30 to 50 percent by weight of zinc chloride, and 30 to 70 percent by weight of ammonium chloride at an increasing temperature until the boiling point of about 123° C. at standard conditions is reached, after which the evaporated solution is cooled to about 15 to 25° C., and the crystals of the desired compound are separated from the mother liquor. The zinc oxide or zinc hydroxide also may be formed in the solution by the introduction of ammonia gas. Also, it is possible to begin with the double salts $ZnCl_2 \cdot 2NH_4Cl$, $ZnCl_2 \cdot 3NH_4Cl$ but, in this case, the required ratio of ions necessary for the production of the compound must be obtained by adding the required ions in their pure form to compensate for any deficiency thereof.

The compound $ZnCl_2 \cdot Zn(NH_3)_2Cl_2 \cdot 3NH_4Cl$ shows, as compared to its mother liquor, incongruent solubility. The X-ray diagram thereof is characteristic and is distinguished from $ZnCl_2$, $NH_4Cl$, $ZnCl_2 \cdot 2NH_4Cl$, $ZnCl_2 \cdot 3NH_4Cl$, or $Zn(NH_3)_2Cl_2$.

The crystalline structure of the compound possibly is triangulartrapezohedral. The compound is altered during heating with the slow splitting-out of $NH_4Cl$ and $NH_3$ into the thermally stable compound $Zn(NH_3)Cl_2$.

The invention will be further illustrated by reference to the following specific examples:

EXAMPLE 1

575 parts by weight of zinc chloride, 675 parts by weight of ammonium chloride, and 173 parts by weight of zinc oxide are dissolved in 500 parts by weight of water and evaporated at an increasing temperature until the boiling point of 123° C. at 760 mm. is reached. The evaporated solution is then slowly cooled to a temperature of 19 to 20° C. whereupon it crystallizes. By centrifuging the resulting crystal paste, there are obtained about 40 percent by weight of crystals of the compound of the invention.

The mother liquor can be reused after adjustment of the remaining components thereof to the weight ratio initially present in the unevaporated solution.

EXAMPLE 2

460 parts by weight of $ZnCl_2$, in the form of a 70 percent aqueous solution, are mixed while stirring with 238 parts by weight of $NH_4Cl$ with a simultaneous introduction of 38.5 parts by weight of ammonia. This mixture is heated up to 105° C. whereupon a homogeneous solution forms. Crystals of the compound of the invention are obtained by slowly cooling the solution.

It will be obvious to those skilled in the art that many modifications may be made within the scope of the present invention without departing from the spirit thereof, and the invention includes all such modifications.

What is claimed is:

1. A compound having the formula $$ZnCl_2 \cdot Zn(NH_3)_2Cl_2 \cdot 3NH_4Cl$$

2. A process for the preparation of a compound having the formula $$ZnCl_2 \cdot Zn(NH_3)_2Cl_2 \cdot 3NH_4Cl$$

which comprises evaporating an aqueous solution containing about 5 to 25 percent by weight of zinc oxide, 30 to 50 percent by weight of zinc chloride, and 30 to 70 percent by weight of ammonium chloride, at an increasing temperature until the boiling point of about 123° C. at standard conditions is reached, cooling the evaporated solution, and separating crystals of the desired compound from the mother liquor.

3. A process according to claim 2 in which the aqueous solution is evaporated to a pasty consistency.

4. A process according to claim 2 in which the evaporated solution is cooled to a temperature in the range of about 15 to 25° C.

References Cited

UNITED STATES PATENTS

| | | | |
|---|---|---|---|
| 2,616,384 | 11/1952 | McBride | 148—26 X |
| 2,879,195 | 3/1959 | Speed et al. | 23—97 X |

FOREIGN PATENTS

| | | | |
|---|---|---|---|
| 1,078,842 | 9/1960 | Germany | 23—356 |

EDWARD J. MEROS, Primary Examiner
G. ALVARO, Assistant Examiner

U.S. Cl. X.R.
148—26